3,131,345
METHOD AND APPARATUS FOR MEASURING MAGNETIC FIELDS, PARTICULARLY THE EARTH MAGNETIC FIELD
Anatole Abragam, Gif-sur-Yvette (Seine-et-Oise), Jean Combrisson, Montgeron (Seine-et-Oise), and Ionel Solomon, Chatillon-sous-Bagneux (Seine), France, assignors to The Commissariat a l'Energie Atomique, Paris, France, an organization of France
Filed Jan. 29, 1960, Ser. No. 5,538
Claims priority, application France Jan. 30, 1959
8 Claims. (Cl. 324—.5)

The present invention relates to methods and/or devices of the type described in the prior U.S. patent application Ser. No. 725,746, filed April 1, 1958, in the names of Anatole Abragam, Jean Combrisson and Ionel Solomon, for "Improvements In or Relating To Method and Device for the Measurement of Magnetic Fields by Magnetic Resonance," now U.S. Patent No. 3,049,661, issued August 14, 1962. Such devices, which are intended to measure magnetic fields, even of low intensity, such as the earth magnetic field, make use, as element sensitive to the magnetic field to be measured, of a liquid sample consisting of a solution containing, on the one hand in the solvent, atomic nuclei (and in particular protons or hydrogen nuclei) having an angular momentum (spin) and a magnetic moment both different from zero, and on the other hand dissolved in this solvent, a paramagnetic substance of hyperfine structure of the stationary or bound type, that is to say including at least one unpaired electron in S-state with respect to a nucleus of said paramagnetic substance (also having an angular momentum and a magnetic moment both different from zero) and having a narrow electronic resonance line or band of a frequency different from zero, even in a zero magnetic field.

An accurate measurement of magnetic fields even of low intensity is possible with such a sample.

First because the nuclear resonance frequency (also called Larmor frequency) of the nuclei of the solvent is exactly proportional to the intensity of the magnetic field in which the sample is placed, and Secondly because it was found that when solutions of such paramagnetic substances (for instance metallic salts of the transition groups or free radicals) were subjected to the action of strong magnetic fields at the electronic resonance frequency of said paramagnetic substance, in order to saturate said electronic resonance line, there was obtained an increase of the nuclear polarization of the solvent (consisting for instance of a liquid such as water containing protons), that is to say of the nuclear resonance macroscopic signal of this solvent, this signal being detectable in a circuit adapted to be tuned to the nuclear resonance frequency and the frequency of tuning being proportional to the magnetic field in which the sample is placed.

Thus, the sample absorbs or emits, when one of its electronic resonance lines is saturated, energy at the nuclear resonance frequency of the nuclei of the solvent, but with an intensity increased by a permanent or dynamic transfer of energy from the electronic spins to the nuclear spins (the term "spin" being used to designate a particle or atom portion having a magnetic moment and an angular momentum both different from zero), thus constituting what may be called a "dynamic," i.e. permanent, polarization. It may also be considered that, in the case of a magnetic field of low intensity, such as the earth field (averaging 0.5 gauss), the increase that is observed in the polarization of the atomic nuclei of the solvent is due to the fact that the unpaired paramagnetic electron is subjected not only to the action of the external magnetic field of low intensity but to that of the field produced by the magnetic moment of a nucleus of said paramagnetic substance with which it is coupled in the hyperfine structure.

It was further indicated in the above mentioned prior patent application that, when some conditions concerning the sign of the magnetic moment are complied with, there is obtained an emission of energy by the atomic nuclei of the solvent at the nuclear resonance frequency thereof, instead of the usual energy absorption and FIGS. 4 and 5 of said prior application showed a device for measuring, without any frequency or magnetic field sweep, the intensity of magnetic fields (in particular of the earth magnetic field). This device, which is based upon such a spontaneous emission of energy, essentially comprises means for saturating the electronic resonance frequency of the solution, means for collecting the energy emitted by said solution at the nuclear resonance frequency of the solvent nuclei and means for measuring the frequency of the energy thus collected, this frequency being, as above indicated, exactly proportional to the intensity of the magnetic field in which the solution is placed and the proportionality coefficient being very accurately known (see for instance the table on pages 2549 to 2551 of the Handbook of Chemistry and Physics, Chemical Rubber Publishing Co., Cleveland, Ohio, U.S.A., 40th edition, 1958, which gives the nuclear frequencies, i.e. Larmor frequencies, in megacycles for fields of 10,000 gauss).

A device according to the above mentioned prior patent application for the measurement of magnetic fields, making use of the spontaneous emission of energy at a frequency proportional to the magnetic field by a solution containing, on the one hand, atomic nuclei having an angular momentum and a magnetic moment both different from zero and, on the other hand, a paramagnetic substance of the above mentioned type, essentially comprises:

(1). A container in which is placed the above-mentioned solution, for instance:

An aqueous solution of nitrosodisulfonate (also called peroxylamine disulfonate) of potassium or sodium, A solution in benzene (or any other organic solvent) of diphenyl-picryl-hydrazyl, A solution in ether of nitrosodisulfonate of tetraphenyl-stibonium (the stibonium deriving from ammonium by substituting antimony for nitrogen), A solution in benzene of picryl-aminocarbazyl, An aqueous solution of ions of a semiquinone such as $(O=C_6H_4-O)^-$;

(2). A high frequency circuit for saturating an electronic resonance line of said paramagnetic substance, this circuit being tuned to the frequency of said line (55 mHz. for nitrosodisulfonate in a field equal to zero or very weak) and including, on the one hand, a high frequency coil surrounding said container to saturate said line and a tuning capacitor and, on the other hand, an oscillator of the same high frequency for feeding current to said coil;

(3) A low frequency circuit for collecting the energy emitted by the solution at the nuclear resonance frequency of the solvent (2,100 Hz. for the protons of water in the earth field), this circuit, which includes a low frequency coil for collecting said energy and a tuning capacitor, being capable of being tuned to said frequency and having a very high quality, or Q, factor so as to be able to work as an auto-oscillator of the maser type (micro-wave amplification by stimulated emission of radiation) at this frequency;

(4) A measurement device (for instance of the decade counter type) for determining the oscillation frequency of the low frequency circuit, this frequency being exactly proportional to the intensity of the magnetic field in which the container is placed.

However we have observed that the effective increase of the nuclear resonance signal obtained by a dynamic polarization making use of an alternating high frequency field to saturate the electronic resonance line of said sample, as specified in said prior patent application, is often (and particularly in the case of magnetic fields of low intensity) smaller than the theoretical increase, for reasons which will be hereinafter stated with reference to FIG. 1.

On the contrary, we have discovered the surprising fact that it is possible to obtain a greater increase of the effective nuclear resonance signal when the electronic resonance line is saturated by means of a circularly polarized field, that is to say of a rotary field, the magnetic intensity vector representative of which rotates in a plane at least substantially perpendicular to the vector representing the magnetic field to be measured in the space where the sample is located.

Consequently, the device for measuring a magnetic field, which comprises, as it was disclosed in the above mentioned prior patent application, in combination, a container placed in said field, in this container a solution consisting of a solvent containing atomic nuclei having an angular momentum and a magnetic moment both different from zero and of a paramagnetic substance having a hyperfine structure of the stationary type with at least one narrow electronic resonance line, said substance being dissolved in said solvent, means for saturating said electronic resonance line so as to cause said atomic nuclei to emit, by nuclear resonance, energy the frequency of which is measured by suitable means, is characterized in that the means for saturating said resonance line are means for creating in said container a rotary magnetic field the magnetic intensity vector representative of which rotates in a plane perpendicular to said field to be measured at the frequency of resonance of said line so as to saturate said line.

Owing to the improvements according to the present invention, the following advantages are obtained:

A supplementary increase of the effective intensity of the nuclear resonance signal (which may be multiplied by a factor as high as 20 in the earth magnetic field of approximately 0.5 gauss);

An increase of the signal to noise ratio;

An increased accuracy;

An increase of the stability of operation as self-oscillator or maser;

A wider range of operation as self-oscillator, and

The fact that it is no longer necessary, as in the device described in the above mentioned prior patent application, to make use of a positive feedback (or of a supplementary coil having a high quality, or Q, coefficient) to increase the quality factor of the low frequency circuit in which the nuclear resonance signal is produced.

We therefore finally obtain a device which is stable and permits of measuring, with a high accuracy, magnetic fields, even of very low intensity (that is to say of an intensity equal to, or lower than, 0.2 gauss).

Preferred embodiments of the present invention will be hereinafter described with reference to the accompanying drawings, given merely by way of example and in which:

FIG. 1 shows curves illustrating the variation of the energetic levels (or permitted values of the energy) plotted in ordinates as a function of the magnetic field, plotted in abscissas in the case of an aqueous solution of a paramagnetic substance, such as nitrosodisulfonate.

FIG. 2 diagrammatically illustrates the layout of a device for measuring magnetic fields by nuclear resonance, according to the invention.

Figure 1:
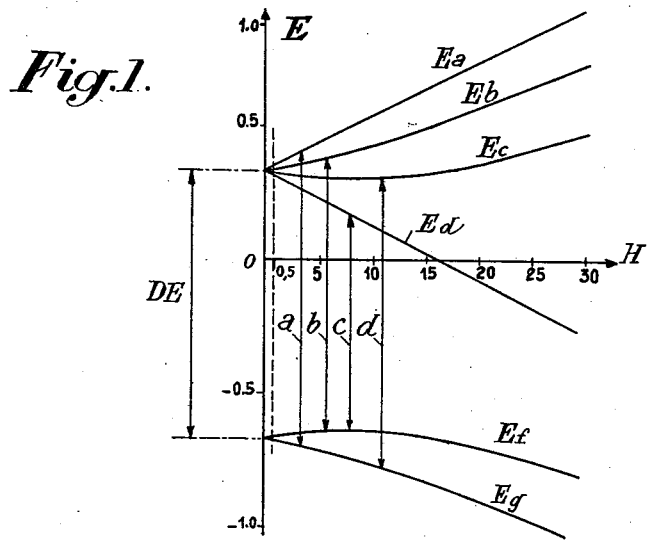
Figure 2:
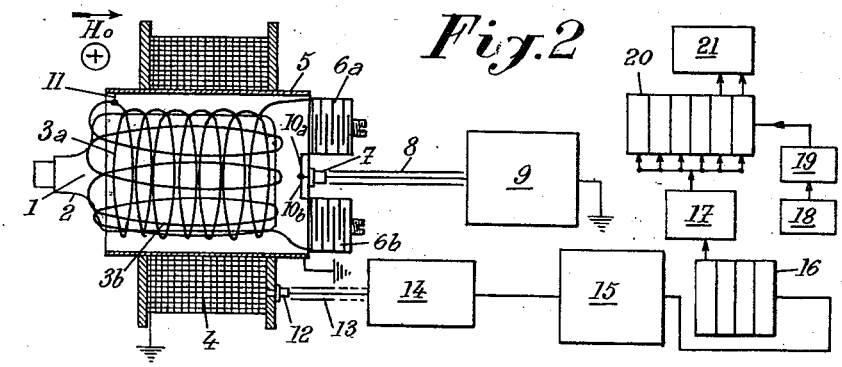

FIG. 1, which corresponds to FIG. 2 of the above mentioned prior patent application, illustrates six curves $Ea$, $Eb$, $Ec$, $Ed$, $Ef$ and $Eg$ of energetic levels, due to the coupling of an electronic spin $I'=\frac{1}{2}$ with the nuclear spin $I=1$ of a nitrosodisulfonate ion.

It is known that an atomic nucleus having a spin quantic $I$ has, in a magnetic field such as $\vec{H}$, $2I+1$ values for its measurable components. This is due to the fact that, by its very definition, spin $I$ is equal to $$\frac{1}{h/2\pi}$$

times the maximum value that can be observed for the mean value of the component of the angular momentum $\vec{R}$ in a given direction, for instance that of the magnetic field $\vec{H}$, that is to say $R_H$. Now the expression of the permitted values of $R_H$ is $R_H = mH./2\pi$, $m$ being the magnetic quantic number which may be given one of the values $I, I-1, I-2, \ldots, I+1, -I$, that is to say $2I+1$ values. Due to the fact that a system characterized by two discrete characteristic states, corresponding to two different values of $m$ and separated by an energy $\Delta E$, may pass from one to the other, that is to say perform a "transition" by emission or absorption of a photon, a spin nucleus $I$, which has in a magnetic field $2I+1$ characteristic states and therefore $2I+1$ energetic levels, may undergo transitions between these levels, which transitions must of course comply with the rules of quantic selection, which permit only some transitions (the rule of selection of the magnetic quanta may be in particular written $\Delta m \pm 1$, which means that only the transitions which vary the integer $m$ by $-1$ or $+1$ are permitted, the variation of energy $\Delta E$ between two energetic levels where a transition is permitted being given by the formula $$\Delta E = -\frac{mH}{I})$$

It is also known that it is possible to conceive the stationary hyperfine structure interactions, for instance of a paramagnetic ion, by having recourse to a coupling of the Russel-Saunders type which combines the nuclear angular momentum vector $\vec{R}$ with the electronic angular momentum vector, that is to say to the coupling of a nuclear spin $I$ with an electronic spin $I'$. Each of the $2I+1$ energetic levels corresponding to nuclear spin $I$ is therefore divided into $2I'+1$ sub-levels corresponding to the electronic spin $I'$. Therefore there are $(2I+1)(2I'+1)$ levels of energy. As $I=1$ for the nitrosodisulfonate ion and $I'=\frac{1}{2}$ (spin of the electron), the coupling produces $3 \times 2 = 6$ energetic levels (or permitted values of the energy) represented by the curves $Ea$, $Eb$, $Ec$, $Ed$, $Ef$ and $Eg$ of FIG. 1, where the difference DE of levels of energy for a magnetic field equal to zero has been taken as unit for the energies, whereas the magnetic fields are plotted in gauss units.

The general shape of these curves is the same for the other paramagnetic substances having a hyperfine structure suitable for the present invention.

As stated in the above mentioned prior patent application, the increase of the nuclear resonance signal of the solvent (of the protons of water for instance) is obtained by saturating an electronic resonance line of the paramagnetic radical, for instance that corresponding to transition $a$ on FIG. 1, which gives an emission nuclear resonance signal (of the solvent), that is to say supplies energy at the nuclear resonance frequency. But for practical purposes, in the case of magnetic fields of very low intensity (lower than 1 gauss), in particular in the case of the earth magnetic field (which is close to 0.5 gauss and is represented by the vertical dotted line), the variation of energy level corresponding to transition $a$ differs from the energy level variations in the other permitted transitions $b$, $c$ and $d$ only by a value of an order corresponding to the width of an electronic line (for instance corresponding to that of transition *a*).

It therefore follows that, when transition *a* is saturated by an alternating high frequency field, there is at the same time produced at least a partial saturation of the transitions *b*, *c* and/or *d*. Now, the saturation of some of the other transitions, for instance that of *c* and *d* in the particular case that is considered, produces an absorption of energy due to the fact that the nuclear signal produced by transitions *c* and *d* is of a sign opposed to that produced by transition *a* (and also by transition *b*). This results in a partial compensation between the different increases, of opposed signs, of the nuclear signal, and the resultant signal is, for instance in the case of the earth field, sometimes ten times smaller than the signal that would be obtained if only transition *a* were selectively saturated (or transitions *a* and *b* which give nuclear signals of the same sign).

On the contrary, when, according to the invention, saturation is obtained by means of a field rotating in a plane perpendicular to the magnetic field to be measured, it has been discovered that when this field rotates in one direction only, the lines (such as *a*, *b*) that emit energy are saturated, whereas when the field rotates in the opposed direction, only the lines (such as *c* and *d*) producing an absorption energy are saturated, only one of the rotary components of the alternating field being effective in the saturation of a given electronic line.

It is therefore possible to perform a selective saturation of the only lines which produce an emission of energy, which increases the nuclear polarization that can be observed macroscopically and facilitates the operation of the device as an self-oscillataor or maser.

FIG. 2 diagrammatically shows a device. This device includes a liquid sample 1, of the type as above stated, for instance an aqueous solution of nitrosodisulfonate, placed in a container 2 (for instance of organic glass, of the type designated by trademarks "Plexiglas" or "Lucite") this container 2 being surrounded:

On the one hand, by two coils 3*a*, 3*b* for applying high frequency current, these coils having their axes at right angles to each other and both at right angles to the field $\vec{H_0}$ to be measured and being each constituted by some turns of a relatively thick wire (for instance of a diameter anging from twenty to thirty tenths of a millimeter); and On the other hand, by a coil 4 intended to collect the low frequency energy, this coil being constituted by a great number of turns (for instance about 3,500) of a thin wire (having for instance a diameter of four tenths of a millimeter), this coil 4 being separated from the high frequency coils 3*a* and 3*b* by a metallic shield 5 which is grounded.

Coils 3*a* and 3*b* belong to circuits tuned to the electronic resonance frequency of said sample (55 mHz. for an aqueous solution of nitrosodisulfonate ions in a magnetic field of low intensity, such as the earth field), or to frequencies little different therefrom, through variable capacitors 6*a* and 6*b* respectively, so as selectively to saturate an electronic resonance line such as *a* (FIG. 1) corresponding to an emission of energy.

Likewise, coil 4 belongs to a circuit tuned, through a variable capacitor (not shown), to the nuclear resonance frequency of the nuclei of the solvent (2,100 Hz. in the earth magnetic field for the protons of water acting as solvent), so as to collect the resonance signal of these nuclei.

The common intake 7 for the high frequency current, which is connected, through a coaxial cable 8, with a stable oscillator 9, for instance a quartz oscillator, of a frequency identical to that of the electronic resonance, is connected through conductors 10*a*, 10*b* to one of the ends of each of the coils 3*a*, 3*b* through capacitors 6*a*, 6*b* respectively, the other end of each of these coils being grounded, for instance by means of a common conductor 11 connected to shield 5 (which, as above stated, is grounded), one of the ends of coil 4 being also grounded.

The low frequency circuit, which collects the magnetic resonance signal by means of coil 4, has a quality, or Q, coefficient which is high but may be obtained without any particular arrangement due to the increase, according to the present invention, of the effective intensity of the nuclear resonance signal. In the embodiment shown by the drawing, the output terminal 12 of the low frequency coil 4 (that is to say the end of said coil that is not grounded) is connected through a coaxial cable 13—preferably through a positive feedback preamplifier is (for instance of the type described in the above mentioned prior patent application and which includes the variable capacitor of the low frequency tuned circuit) and an amplifier 15 having a narrow pass-band which is preferably adjustable (in order to avoid amplification of parasitic signals coming from the electric network or from the high frequency that is not stopped by shield 5)—to a counter 16 constituted for instance by four decades (or scales of ten) which permits of counting $10^4$ Larmor periods, and emits, after such a number of periods, an impulse in a trigger stages 17 (constituted for instance by a multivibrator) which then delivers a triggering and resetting to zero signal used as it will be hereinafter referred to.

On the other hand, a time counting device consisting of a conventional quartz oscillator 18 of a frequency of 100 kHz., has it output connected to a wave-shaping unit 19 which transforms, for instance by successive clippings and amplifications (as indicated for instance in "Electronic and Radio Engineering" by Frederick E. Terman, 4th ed., 1955, page 637), the sinusoidal wave into rectangular impulses and delivers these impulses at the same frequency, that is to say every micro-second, into a counter 20, comprising for instance six decades, which counts the impulses, that is to say the 10 microsecond intervals. The counting of these impulses in counter 20 is stopped after 10,000 Larmor periods by trippling device 17, which sends a blocking impulse to every stage of counter 20, the state of this counter (which represents the duration, in $10^{-5}$ seconds, of 10,000 Larmor periods, i.e. the Larmor period in $10^{-9}$ seconds, which is inversely proportional to the intensity of the magnetic field $\vec{H_0}$) being transferred to a recording apparatus 21 of the MECI type.

Advantageously, we may transfer to recording device 21 only the state of two consecutive decades of counter 20, the choice of the pair of decades that are transferred determining the accuracy of counting. For instance, if we choose the two first decades, starting from the right, we obtain the maximum accuracy (0.1 gamma) and, through other suitable connections, it is possible to have a precision of 1 gamma or 10 gammas (one gamma corresponding to $10^{-5}$ gauss).

Figure 3:
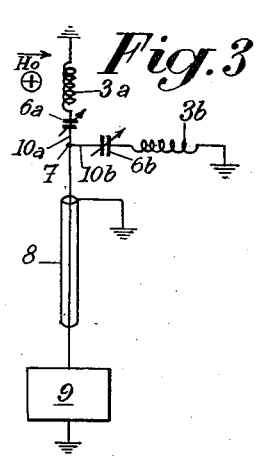
FIG. 3 shows the high frequency circuits which, in the device of FIG. 2, produce the saturation rotary field.
Figure 4:
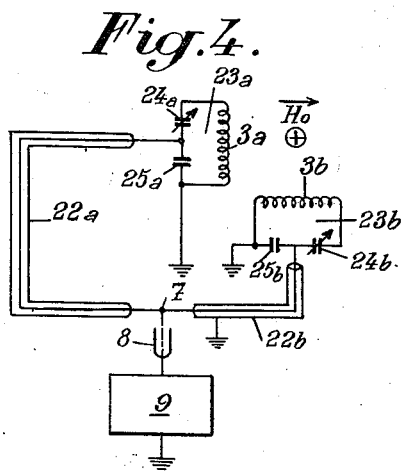
FIG. 4 shows another arrangement of such high frequency circuits.

On FIGS. 3 and 4, we have shown two preferred embodiments of the means for producing a rotary field in a plane perpendicular to $H_0$.

In the construction of FIG. 3 which corresponds to the layout of FIG. 2, oscillator 9 which oscillates at the electronic resonance frequency (55 mHz.) for the earth field has its output connected, through coaxial cable 8, to two oscillatory circuits 3*a*–6*a* and 3*b*–6*b*. One end of these circuits is conneced, through a line 10*a*, 10*b*, to the common intake 7 and the other end of each of said circuits is grounded (for instance as shown by FIG. 2, by connection to shield 5 through a conductor 11). In order to obtain a rotary field, it suffices to adjust variable capacitor 6*a* and 6*b* on either side of the resonance, one of the circuits (for instance circuit 3*a*–6*a*) oscillating with a lead of ⅛ of a period with respect to oscillator 9, whereas the other circuit (for instance 3*b*–6*b*) oscillates with a leg of ⅛ of a period with respect to oscillator 9. The whole thus produces a high frequency field that is circularly polarized in a plane perpendicular to $\vec{H}_0$ due to the fact that coils 3a and 3b have their respective axes at right angles to each other and both at right angles to vector $\vec{H}_0$ as shown by FIG. 3.

In the modification of FIG. 4, the circular polarization of the saturating high frequency field is obtained by two coaxial cables 22a and 22b the length of which differs from each other by a value which corresponds, for the velocity of propagation of the high frequency that is used, to ¼ of a period, so as to obtain a phase difference of ¼ of a period between the currents applied respectively to the oscillatory circuits 23a, 23b both tuned to the same frequency and each of which including one of the coils 3a, 3b. As in the preceding case, these two coils have their respective axes at right angles to each other and both at right angles to vector $\vec{H}_0$. Variable capacitors capacitors 24a, 24b make it possible to tune these circuits (in the same manner as the capacitors 6a, 6b of the embodiment of FIGS. 2 and 3), whereas capacitors 25a, 25b are employed to match the circuits to the cables.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

Furthermore, some elements of the layout of FIG. 2 may be made as described in the above mentioned prior patent application and/or in the U.S. patent application Ser. No. 813,158, filed May 14, 1959, now Patent No. 3,049,662.

What we claim is:

1. A device for measuring a weak magnetic field which comprises, in combination, a container placed in said field, in this container a solution consisting of a solvent containing atomic nuclei having an angular momentum and a magnetic moment both known and different from zero and of a paramagnetic substance having a hyperfine structure of the stationary type with a non-zero splitting in said magnetic field and with at least two narrow electronic resonance lines of close frequencies saturable by oppositely polarized radio-frequency fields, said substance being dissolved in said solvent, means for producing in said container a polarized radio-frequency rotary field, the magnetic intensity vector representative of which rotates in a plane perpendicular to said field to be measured and with a frequency in a frequency band including said close frequencies so as to saturate among said lines any line saturable by said polarized radio-frequency field means for collecting the energy emitted by said solution under the effect of the saturation of said any line in said field and means for determining the frequency of said energy.

2. A device according to claim 1 in which said means for producing said rotary field comprise an oscillator working at said frequency of resonance of said line, two coils having their respective axes at right angles to each other and both at right angles to the direction of said magnetic field to be measured, and means for feeding from said oscillator two currents to said coils respectively, said currents being in phase difference of 90° one with respect to the other.

3. A device according to claim 1 in which said means for producing said rotary field comprise an oscillator working at said frequency of resonance of said line, two coils having their respective axes at right angles to each other and both at right angles to the direction of said magnetic field to be measured, two variable capacitors each inserted in series between one of said coils respectively and the output of said oscillator, each of said capacitors forming with the corresponding coil a resonant circuit fed from said oscillator, one of said capacitors being adjusted so that the resonant circuit to which it belongs oscillates with an advance of ⅛ of a period with respect to said oscillator and the other capacitor being adjusted so that the resonant circuit to which it belongs oscillates with a lag of ⅛ of a period with respect to said oscillator.

4. A device according to claim 1 in which said means for producing said rotary field comprise an oscillator working at said frequency of resonance of said line, two coils having their respective axes at right angles to each other and both at right angles to the direction of said magnetic field to be measured, two closed oscillatory circuits each including one of said coils respectively and two coaxial cables both connected at one end thereof with the output of said oscillator, the other ends of said cables being connected with said oscillatory circuits respectively, said coaxial cables having respective lengths differing from each other by one fourth of the wavelength corresponding to the frequency of resonance of said line.

5. Method for measuring the intensity of the earth magnetic field, or of a similar weak magnetic field, comprising the steps of inserting in said field a solution of a paramagnetic substance in a solvent, said solvent including atomic nuclei having an angular momentum and a magnetic moment both known and different from zero and said paramagnetic substance having a hyperfine structure with a non-zero splitting in said magnetic field and with at least two narrow electronic resonance lines of close frequencies saturable by oppositely polarized radio-frequency fields, subjecting said solution to a radio-frequency field polarized in a given direction which has the representative magnetic intensity vector thereof rotating in a plane substantially perpendicular to said magnetic field and with a frequency in a frequency band including said close frequencies, picking-up the energy emitted by said atomic nuclei at the resonance nuclear frequency thereof in response to the saturation of at least one of said lines by said rotating radiofrequency field polarized in a given direction, determining the frequency of the picked-up energy, and deducting from said determined frequency the intensity of said field.

6. A device for measuring a weak magnetic field which comprises, in combination, a container placed in said field, in this container a solution consisting of a solvent containing atomic nuclei having an angular momentum and a magnetic moment both known and different from zero and of a paramagnetic substance having a hyperfine structure of the stationary type with a non-zero splitting in said magnetic field and with at least two narrow electronic resonance lines of close frequencies saturable by oppositely polarized radiofrequency fields, said substance being dissolved in said solvent, an oscillator operating at a frequency substantially equal to one of said electronic resonance lines, at least two coils having their respective axes located in a plane perpendicular to the direction of said weak magnetic field to be measured, means for feeding from said oscillator in each of said coils a current, the phase difference between currents feeding successive coils being equal to the angle between the corresponding axes of said coils in said plane, thereby producing in said container a polarized radiofrequency field, the magnetic intensity vector representative of which rotates in said plane perpendicular to said field to be measured and with a frequency in a frequency band including said close frequencies so as to saturate, among said lines, any line saturable by said polarized radiofrequency field, means for collecting the energy emitted by said solution under the effect of the saturation of said any line in said field and means for determining the frequency of said energy.

7. A device according to claim 6, comprising two coils having their respective axes at right angles to each other in said plane and wherein said phase difference is equal to 90 degrees.

8. A device according to claim 6 in which said paramagnetic substance comprises nitrosodisulfonate ions and said oscillator operates at substantially 55 megacycles per second.

References Cited in the file of this patent

FOREIGN PATENTS

| | | |
|---|---|---|
| 566,137 | Belgium | Sept. 27, 1958 |
| 1,180,455 | France | Dec. 29, 1958 |

OTHER REFERENCES

Whitfield et al.: Physical Review, vol. 106, No. 5, June 1, 1957, pages 918 to 920.

Carver et al.: Physical Review, vol. 102, No. 4, May 15, 1956, pages 975 through 980.

Andrew: Nuclear Magnetic Resonance, Cambridge University Press, 1955, pages 10, 11, and 82 relied upon.

Staub et al.: Helvetica Physical Acta, vol. 23, 1950 (pages 63–92), pages 71 and 73 to 81 principally relied on.

Burgess et al.: Physical Review, vol. 100, No. 2, October 1955, pages 752 and 753.